July 20, 1965  N. A. SCHOLTUS  3,195,158
FLOWER POT WASHER
Filed Feb. 4, 1964
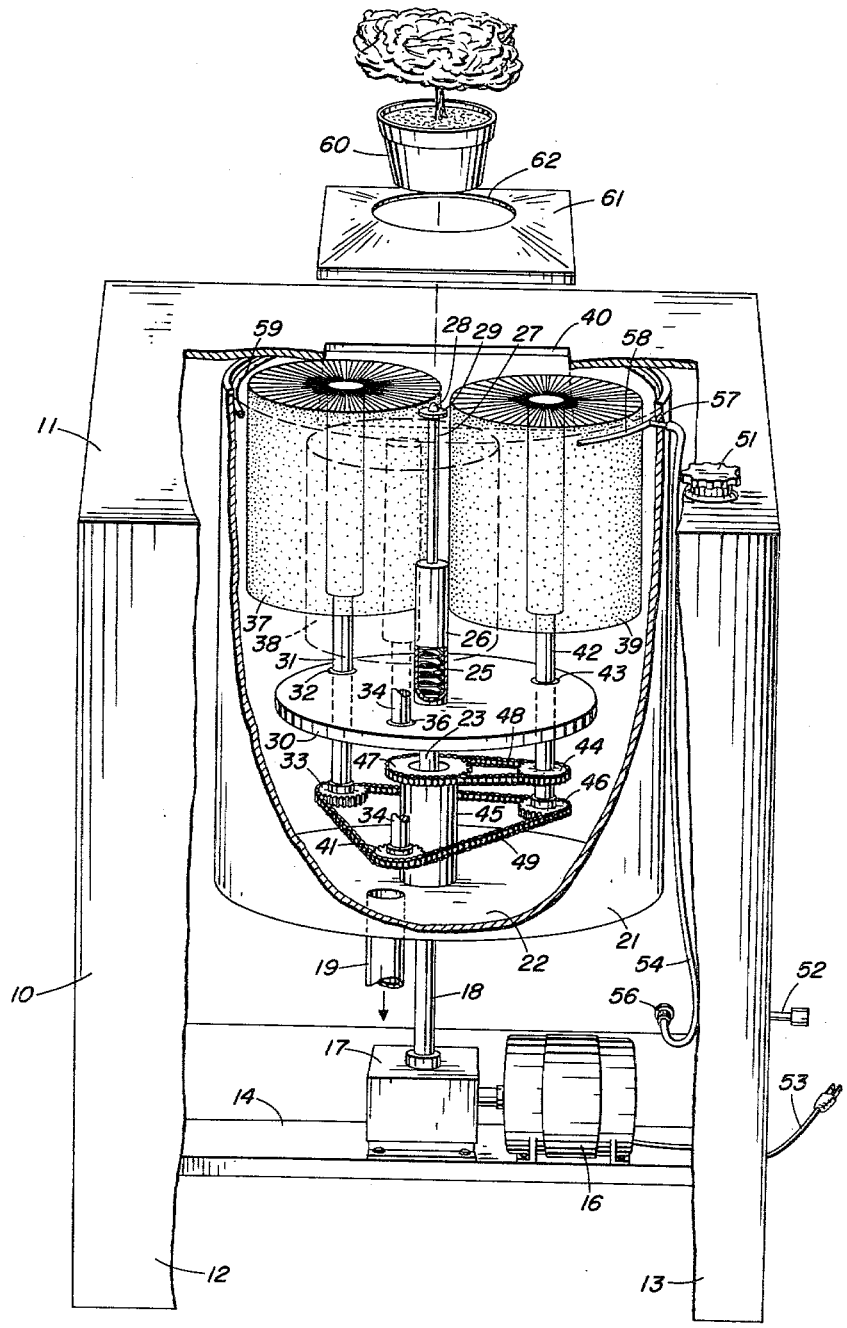
INVENTOR.
Nicholas A. Scholtus
BY
Attorney

3,195,158
FLOWER POT WASHER
Nicholas A. Scholtus, 127 Patricia Lane NW.,
Cedar Rapids, Iowa
Filed Feb. 4, 1964, Ser. No. 342,392
1 Claim. (Cl. 15—56)

This invention relates in general to washing machines and in particular to flower pot washers.

Commercial nurseries and greenhouses use many flower pots for their plants. These pots often become dirty on the outside and it is desirable to wash them before selling them.

It is an object of this invention, therefore, to provide a machine for washing flower pots.

Another object is to provide a machine which is capable of washing flower pots of different sizes.

A feature of this invention is found in the provision for three motor-driven brushes mounted adjacent each other in combination with a water spray to clean flower pots.

Further objects, advantages and features will become apparent from the following description and claims when read in view of the drawing, in which;

The figure is a cut-away view of the washer according to this invention.

The figure illustrates a frame member 10 which has supporting legs 12 and 13. A transverse frame member 14 supports a motor 16 and a gear box 17. The motor is connected to drive the gear box and shaft 18 rotatable extends through the bottom 22 of washer tank 21. Tank 21 is supported from frame 10 by suitable support means. The upper end 23 of shaft 18 is attached to a turntable 30. Three shafts 31, 34 and 42 are supported by member 30 by suitable bearings 32, 36 and 43 and brushes 37, 38 and 39 are mounted on shafts 31, 34 and 42.

Below member 30 on shafts 31, 34 and 42 are mounted a number of gears and two drive belts 48 and 49. Gears 44 and 46 are mounted on shaft 42. A collar 45 is attached to the bottom 22 of tank 21 and supports a fixed gear 47. Gear 33 is attached to shaft 31 and gear 41 is attached to shaft 34. Belt 48 passes over gears 44 and 47 and belt 49 passes over gears 33, 41 and 46. Gear 47 is preferably a larger gear than gear 44 to impart a high speed to the brushes.

A drain spout 19 is mounted in the bottom 22 of tank 21.

A guide shaft 27 has a point 28 and disc 29 and is telescopically mounted in a cylinder 26 which is connected to member 30 between the brushes 37, 38 and 39. A spring 25 within cylinder 26 urges shaft upwardly.

An opening 40 is formed in the top 11 of the frame 10. Opening 40 is square and receives a splash cover 61 therein. Cover 61 may be flexible and has an opening 62 through which a flower pot 60 may be inserted to be washed by the brushes. Water or other liquid is supplied to the machine by pipe 52, coupling 56, tube 54 and pipe 57 which extends through the wall of tank 21. A header 58 attaches to pipe 57 and has openings 59 to allow the fluid to be sprayed onto the brushes and flower pot.

A power cord 53 is connected to a switch 51 which is in turn connected to motor 16.

In operation, a water supply which is connected to pipe 52 is turned on to provide a spray from header 58 and switch 51 is turned on to start the motor 16. Shaft 18 rotates driving member 30 and simultaneously driving brushes 37, 38 and 39 through the gears and belts 48 and 49. Gear 47 is fixed, but since turntable 30 rotates belt 48 causes shafts 31, 34 and 42 to turn.

A flower pot is inserted so that its bottom drain fits over end 28 of shaft 27 and is lowered into the machine between the brushes through opening 62. The brushes clean the pot and it is removed manually.

The machine quickly and easily cleans the flower pots.

Although this invention has been described with respect to a preferred embodiment, changes and modifications may be made which are within the full intended scope as defined by the appended claim.

I claim:

A flower pot washer comprising a frame member, a driving means mounted on the frame member, a turntable attached to the output shaft of the driving means and rotated by it, a plurality of brush shafts rotatably supported by the turntable about its periphery, brushes mounted on each brush shaft, a fixed pulley supported by the frame on the center axis of the turntable, a second pulley attached to one of the brush shafts, a first belt coupling the fixed pulley and the second pulley, a plurality of other pulleys mounted on the plurality of brush shafts, and a second belt connecting the plurality of other pulleys.

References Cited by the Examiner

UNITED STATES PATENTS

| 1,837,389 | 12/31 | Albany | 15—56 |
| 2,274,309 | 2/42 | Velton | 15—56 |
| 3,115,144 | 12/63 | Sadwith | 134—81 X |

FOREIGN PATENTS

| 65,328 | 1/47 | Denmark. |
| 361,429 | 5/62 | Switzerland. |

CHARLES A. WILLMUTH, *Primary Examiner.*